July 5, 1955
H. D. HURT
2,712,339
INNER TUBE FOR PNEUMATIC TIRES
Filed Sept. 30, 1952
2 Sheets-Sheet 1
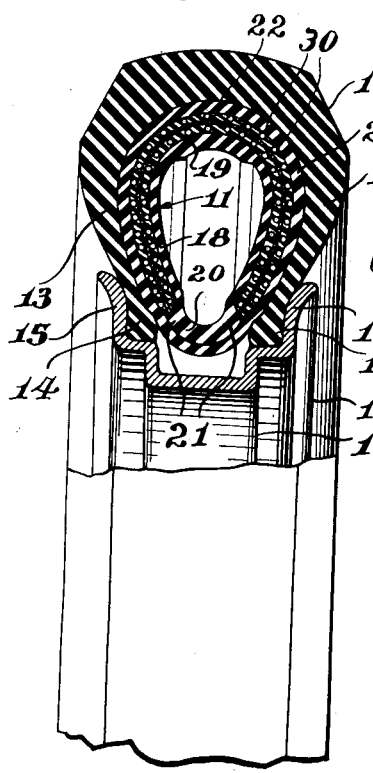
Fig. 1.
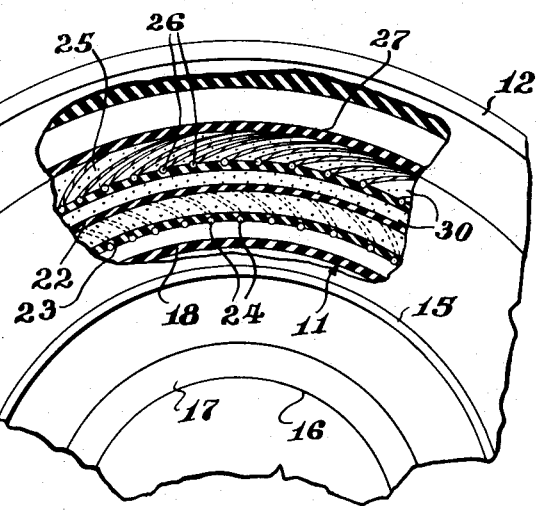
Fig. 2.
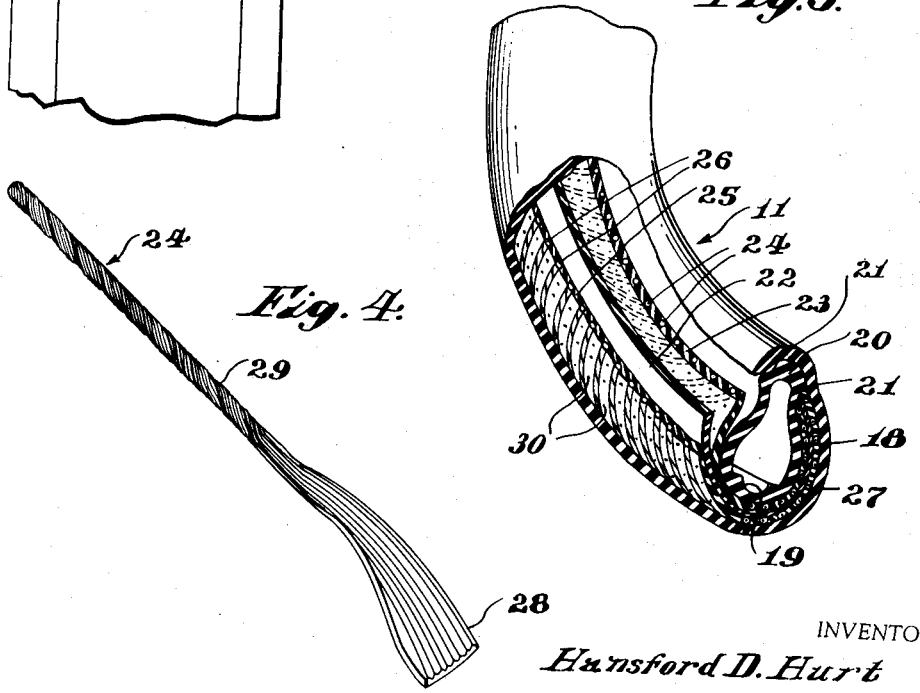
Fig. 3.
Fig. 4.
INVENTOR
Hansford D. Hurt
BY Herman L. Gordon
ATTORNEY July 5, 1955  H. D. HURT  2,712,339
INNER TUBE FOR PNEUMATIC TIRES
Filed Sept. 30, 1952  2 Sheets-Sheet 2
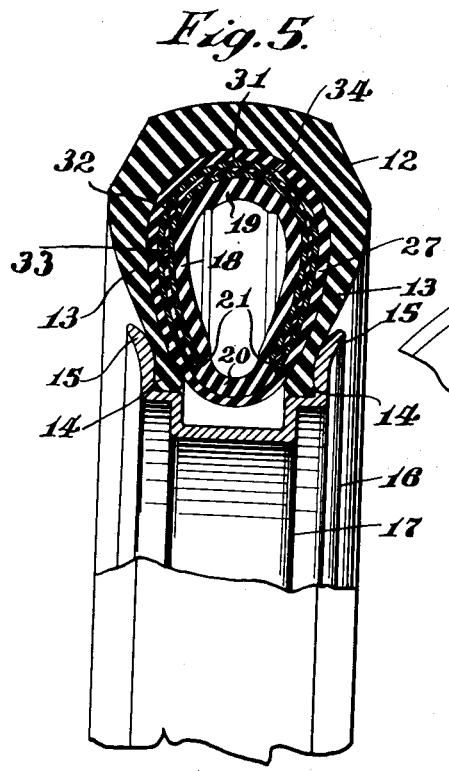
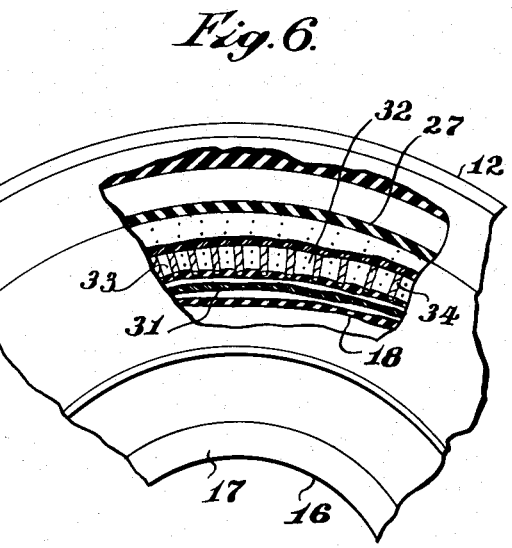
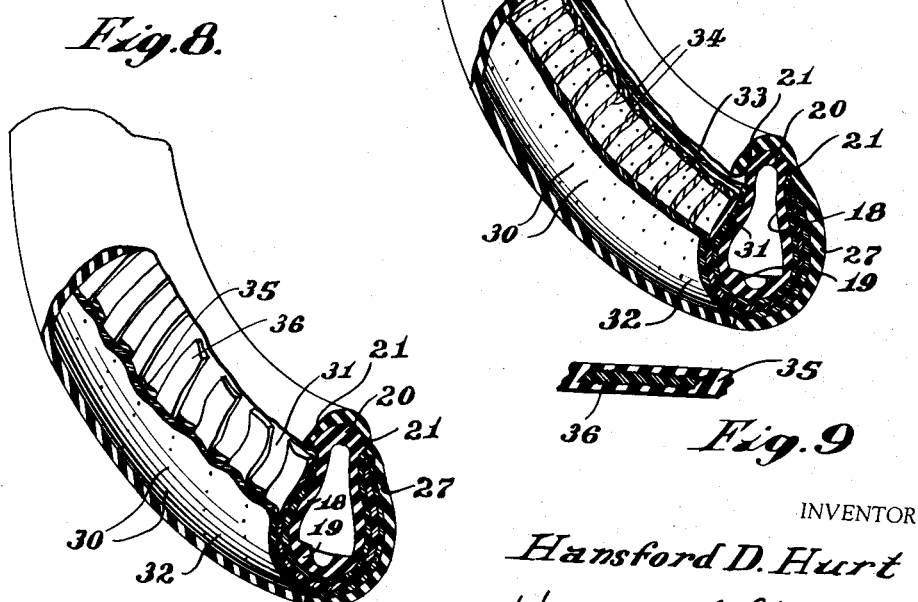
INVENTOR
Hansford D. Hurt
BY Herman L. Gordon
ATTORNEY

United States Patent Office 2,712,339
Patented July 5, 1955

2,712,339
INNER TUBE FOR PNEUMATIC TIRES
Hansford D. Hurt, Arlington, Calif.

Application September 30, 1952, Serial No. 312,261

8 Claims. (Cl. 152—350)

This invention relates to inner tubes for pneumatic tires, and more particularly to a novel and improved inner tube structure of the anti-blowout type particularly suitable for motor vehicles, bicycles, and the like.

A main object of the invention is to provide a novel and improved inner tube which is simple in construction, which is not subject to blowouts, and which greatly prolongs the useful life of the tire in which it is employed.

A further object of the invention is to provide an improved inner tube of the internally reinforced type, said inner tube being relatively inexpensive to manufacture, being protected against rim cuts, and being substantially leak-proof.

A still further object of the invention is to provide an improved inner tube of the internally reinforced type, the reinforcing means being of a multiple-laminate type and employing non-fibrous reinforcing material, whereby blowouts are effectively prevented.

A still further object of the invention is to provide an improved internally reinforced inner tube of the type having multiple internal reinforcing laminations and provided with internal self-sealing structure, thereby preventing air leaks around puncturing objects which may penetrate said structure.

A still further object of the invention is to provide an improved internally reinforced inner tube employing reinforcing laminations comprising solidified, non-fibrous, and fully processed textile plastic shield layers which have been oriented and heat-set for adequate dimensional stability, thus assuring a high degree of blowout protection for the tube.

A still further object of the invention is to provide an improved internal reinforcing means for an inner tube, without requiring the use of fibrous threads, filaments, or fibrous cords as reinforcing elements, thereby requiring fewer parts in the finished tube, simplifying the fabrication of the tube, and reducing friction in the finished tube while in service.

Further objects and advantages of the invention will become apparent from the following description and claims, and from the accompanying drawings, wherein:

Figure 1 is a vertical cross-sectional view taken transversely through a fragmentary portion of an automobile tire containing one form of internally reinforced inner tube constructed in accordance with the present invention.

Figure 2 is a side elevational view of the fragmentary portion of the tire of Figure 1, and tube being partly broken away, and the elements of the inner tube being shown partly in longitudinal vertical cross-section and partly in side elevation.

Figure 3 is a perspective fragmentary view of the inner tube of Figures 1 and 2, the tube being shown in cross-section and with parts broken away to reveal its structure.

Figure 4 is an enlarged fragmentary perspective view of one of the cord elements employed in the reinforcing layers of the inner tube of Figures 1 to 3.

Figure 5 is a vertical cross-sectional view similar to Figure 1, showing a modified form of inner tube according to the present invention.

Figure 6 is a side elevational view of the fragmentary portion of the tire and tube of Figure 5, the tire and tube being shown partly broken away, in the same manner as in Figure 2, and showing the elements of the inner tube partly in longitudinal vertical cross-section and partly in side elevation.

Figure 7 is a perspective fragmentary view of the inner tube of Figures 5 and 6, the tube being shown in cross-section and with parts broken away to reveal its structure.

Figure 8 is a perspective view, similar to Figure 7, showing a further modification of the inner tube of the present invention.

Figure 9 is an enlarged cross-sectional detail view taken through the inner tube of Figure 8, transverse to one of the reinforcing bands thereof.

The improved inner tube of the present invention employs plastic materials of the type presently used to produce textile fibres, the plastic materials being herein employed in solidified non-fibrous form for creating the anti-blowout strain-resisting elements of the inner tube. There are many types of such plastic materials now available for use, some of which are identified by trade names and others by generic names, such as, for example, nylon and rayon.

The acrylic and polyester plastics, as well as nylon and rayon, are also desirable and preferable materials for use in producing the strain-resisting elements of the inner tube of the present invention.

The plastic strain-resisting elements are suitably processed before fabrication of the inner tube, by orienting and heat-setting said elements for dimensional stability by conventional methods now known to the manufacturers of these materials. For example, these strain-resisting elements are oriented and dimensionally stabilized by heat-setting or tempering so that the strength and resistance to longitudinal deformation of the elements are greatly increased, which therefore provides great resistance to elongation of said elements when subjected to working stresses while in service.

Referring now to the drawings, and more particularly to Figures 1 to 4, 11 generally designates an inner tube constructed in accordance with the present invention, said tube being shown installed in a tire 12 having the side walls 13, 13 which terminate in the bead portions 14, 14. The bead portions 14, 14 are received in the rim elements 15, 15 of a conventional vehicle wheel 16, the well of the wheel being shown at 17.

The inner tube 11 comprises an inner envelope 18 having an internally thickened top portion 19 (as viewed in Figure 1) and an externally thickened bottom portion 20. The externally thickened portion 20 defines a pair of external shoulders 21, 21. The inner envelope 18 is preferably made of material having special puncture-sealing characteristics, such as a gummy artificial or synthetic compound, gummy latex compound, or any plastic material having internal adhesive characteristics which will be maintained under the temperatures encountered in road conditions.

Due to the special cross-sectional shape of the envelope 18, a seat is defined on the outer surface thereof around its tread portion between the shoulders 21, 21. This seat is provided to receive and hold a triple-laminated reinforcing structure, one form of which is specifically illustrated in Figures 1, 2 and 3.

In Figures 1, 2 and 3, the triple-laminated reinforcing structure comprises a central plastic layer 22 having on one side thereof a matrix 23 of rubber-like material in which are embedded the diagonally positioned, side-by-side plastic cords 24, and on the other side another rubber-like matrix 25 in which are embedded the diagonally positioned, side-by-side plastic cords 26. As shown, the plastic cords 26 extend substantially at right angles to the plastic cords 24. The matrices 23 and 25, containing their diagonally extending plastic cords 24 and 26, are adherently joined to the central thin plastic sheet 22, which is pre-stretched and oriented in the direction of the tube axis, namely, the circumferential direction of the tube, whereby the direction of orientation (maximum strain resistance) of the sheet 22 is at an angle of 45 degrees to the directions of the respective cords 24 and 26.

The laminated structure above described is placed in the seat defined between the shoulders 21, 21, and then an outer tubular sheath 27 is placed over the composite whole, said outer sheath being of rubber-like material. Following this, vulcanizing heat is applied, thus joining the parts into a unitary single inner tube.

The tube valve is, of course, installed in the tube in a conventional manner.

As is illustrated in Figure 1, the permanent elastic area comprising the externally thickened tube portion 20 is arranged so that it will be located substantially in the well 17 of the wheel so that this elastic area stretches independently of the reinforced portion of the tube. The reinforced portion of the tube is arranged to extend inwardly over the annular areas adjacent the joints between the beads 14 and the rim elements 15 to protect the tube against rim cuts.

The cord elements 24 and 26 are made from relatively thin and narrow plastic strip sheet material, or strip section material, such as the strip material shown at 28 in Figure 4. This strip material is further prepared for use by coating same with a plastic binding agent, which when dry, allows the strip sections to be spirally twisted so that they form rounded cord elements 29. After the spiral twisting of these elements, they are subjected to a high temperature so that they are sealed together on the inside surfaces thereof, thereby providing a permanent rounded shape for the cord elements. The strip material 28 is previously oriented and heat-set by conventional methods to provide maximum strain resistance in the longitudinal direction of the strip.

As shown in Figure 4, the strip material 28 is longitudinally grooved or serrated on the outside surface thereof, so that the serrations or grooves are externally exposed when the strip is twisted, providing an exterior highly efficient antislip bonding surface.

The inside surface of the inner, gummy envelope 18 is preferably coated with powder or other substance which is non-tacky at normal temperatures, thus preventing the interior surfaces of the envelope 18 from sticking together prior to use of the tube.

It is known that a considerable temperature increase develops in a tire and in the inner tube contained therein, caused by the rapid flexing of these members while in service. The textile plastic materials employed in the triple-laminate reinforcing member has considerably higher heat insulating properties than rubber or the synthetic substitutes therefor employed in the inner envelope 18 and the outer tubular sheath 27. Therefore, the reinforcing member is preferably formed with minute radial perforations 30 extending through the matrices 23 and 25 and the intervening plastic sheet 22, said perforations being distributed uniformly over the reinforcing member and allowing the vulcanizing material to ooze into the perforations, thus providing a locking means for anchoring the reinforcing member to the inner and outer elements of the tube, as well as providing heat transmission paths for the outward escape of generated heat from the inside of the laminated reinforcing member.

Furthermore, the matrix material employed for the matrices 23 and 25 may be made of known rubber or plastic material having high heat conductivity, so as to rapidly convey excessive generated heat from the tread portion of the inner tube. The outer sheath 27 is preferably made of rubber-like material having high heat conductivity. This will serve to dissipate and conduct generated heat from the tread portions of both the tire and the tube laterally away from said tread portions and toward the metal rim elements 15, 15.

Referring now to the form of the invention illustrated in Figures 5, 6 and 7, the triple-laminated reinforcing structure comprises respective inner and outer plastic layers 31 and 32, between which is interposed a matrix 33 of rubber-like material containing the uniformly spaced, transversely arranged plastic cords 34. Cords 34 are formed in the same manner as the cords 24 and 26 of Figures 1 to 3, namely, by the process previously described in connection with Figure 4. As shown in Figures 5 and 7, the cords extend transversely around the reinforcing structure substantially from one outer shoulder 21 to the other outer shoulder 21 of the inner envelope 18. The plastic sheets 31 and 32 are pre-stretched and oriented in the direction of the tube axis, namely, the circumferential direction of the tube, as in the case of sheet 22 of Figures 1 to 3.

The laminated structure comprising sheets 31 and 32, with the interposed matrix 33, is placed in the seat defined between shoulders 21, 21, and the outer tubular sheath 27 is placed over the composite whole, after which vulcanizing heat is applied, joining the parts into a unitary whole, as in the case of the form of the invention illustrated in Figures 1 to 3.

Referring now to the form shown in Figure 8, the triple-laminated reinforcing structure comprises the inner and outer plastic layers 31 and 32, between which is interposed a matrix 35 of rubber-like material containing the uniformly spaced, transversely extending plastic bands 36. The bands 36 are oriented in a direction parallel to their length and are also heat-set for dimensional stability. The plastic sheets 31 and 32 are oriented in a direction at right angles to the direction of orientation of the bands 36, namely, the circumferential direction of the tube, as in Figures 5, 6 and 7. The plastic bands 36 may have any desired cross-sectional shape, such as rectangular, parallelogram, or the like. Merely by way of example, the bands are illustrated as being of parallelogram cross-sectional shape, as shown in Figure 9.

The triple-laminate structure of Figure 8 is placed in the seat defined between shoulders 21, 21 and the outer tubular sheath 27 is placed over the composite whole, after which vulcanizing heat is applied, joining the parts into a unitary whole, as in the previously described forms of the invention.

As in the case of the form illustrated in Figures 1, 2 and 3, the triple-laminate reinforcing structures of Figures 5, 6 and 7 and of Figures 8 and 9, may be formed with the minute radial perforations 30 extending through the plastic sheets and matrices of the reinforcing structures.

The bands 36 of Figure 8 may be formed on the opposite faces thereof with longitudinal ridges or grooves to improve the bond between said bands and the matrix 35.

While certain specific embodiments of improved internally reinforced inner tubes have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an inner tube, an inner tubular envelope of stretchable elastic material externally thickened at one portion thereof to define external shoulders, a plurality of laminations secured on the external surface of said envelope and extending adjacent said shoulders, at least one of said laminations being substantially non-stretchable in a direction parallel to the major circumferential direction of the tube and another of said laminations comprising a matrix of elastic stretchable material and a plurality of elongated, substantially non-stretchable elements extending at a substantial angle to said major circumferential direction, and an outer tubular envelope of stretchable elastic material secured on said laminations and said externally thickened portion of the inner envelope.

2. In an inner tube, an inner tubular envelope of stretchable, gummy, self-sealing elastic material externally thickened at the inner major circumferential portion thereof to define external shoulders, a plurality of laminations secured on the external surface of said envelope and extending adjacent said shoulders, at least one of said laminations comprising a sheet of plastic material which is substantially non-stretchable in a direction parallel to the major circumferential direction of the tube, another of said laminations comprising a matrix of elastic stretchable material and a plurality of elongated, plastic, substantially non-stretchable elements extending at a substantial angle to said major circumferential direction, and an outer tubular envelope of stretchable elastic material secured on said laminations and said externally thickened portion of the inner envelope.

3. In an inner tube, an inner tubular envelope of stretchable elastic gummy material externally thickened at the inner major circumferential portion thereof to define a pair of external shoulders, a triple-laminate reinforcing member secured on the external surface of said envelope and extending adjacent said shoulders, said reinforcing member comprising three laminations, at least one of which comprises a sheet of plastic material which is substantially non-stretchable in a direction parallel to the major circumferential direction of the tube and another of which comprises a rubber-like matrix having a plurality of side-by-side elongated, substantially non-stretchable plastic elements embedded therein and extending at a substantial angle to said major circumferential direction, and an outer tubular envelope of stretchable elastic material secured on said reinforcing member and said thickened portion of the inner envelope.

4. In an inner tube, an inner tubular envelope of stretchable elastic material, a laminated reinforcing member secured on the external surface of said envelope, one of the laminations of said reinforcing member comprising a sheet of plastic material which is substantially non-stretchable in a direction parallel to the major circumferential direction of the tube and another of the laminations comprising a rubber-like matrix having a plurality of side-by-side elongated, substantially non-stretchable plastic elements embedded therein and extending at a substantial angle to said major circumferential direction, and an outer tubular envelope of stretchable elastic material secured around said reinforcing member and said inner envelope.

5. In an inner tube, an inner tubular envelope of stretchable, elastic, gummy material externally thickened at the inner major circumferential portion thereof to define a pair of external shoulders, a triple-laminate reinforcing member secured on the external surface of said envelope and extending adjacent said shoulders, said reinforcing member comprising three laminations, the center lamination comprising a sheet of plastic material which is substantially non-stretchable in a direction parallel to the major circumferential direction of the tube and the other laminations each comprising a rubber-like matrix having a plurality of side-by-side elongated, substantially non-stretchable plastic elements embedded therein and extending at a substantial angle to said major circumferential direction, and an outer tubular envelope of stretchable elastic material secured on said reinforcing member and said thickened portion of the inner envelope.

6. In an inner tube, an inner tubular envelope of stretchable, elastic, gummy material externally thickened at the inner major circumferential portion thereof to define a pair of external shoulders, a triple-laminate reinforcing member secured on the external surface of said envelope and extending adjacent said shoulders, said reinforcing member comprising three laminations, the two outer laminations each comprising a sheet of plastic material which is substantially non-stretchable in a direction parallel to the major circumferential direction of the tube and the center lamination comprising a rubber-like matrix having a plurality of side-by-side, elongated, substantially non-stretchable plastic elements embedded therein and extending at a substantial angle to said major circumferential direction, and an outer tubular envelope of stretchable elastic material secured on said reinforcing member and said thickened portion of the inner envelope.

7. In an inner tube, an inner tubular envelope of stretchable, elastic, gummy material externally thickened at the inner major circumferential portion thereof to define a pair of external shoulders, a triple-laminate reinforcing member secured on the external surface of said envelope and extending adjacent said shoulders, said reinforcing member comprising three laminations, at least one of which comprises a sheet of plastic material which is substantially non-stretchable in a direction parallel to the major circumferential direction of the tube and another of which comprises a rubber-like matrix having a plurality of side-by-side twisted plastic cord elements embedded therein and being substantially non-stretchable, said cord elements extending at a substantial angle to said major circumferential direction, and an outer tubular envelope of stretchable elastic material secured on said reinforcing member and said thickened portion of the inner envelope.

8. In an inner tube, an inner tubular envelope of stretchable elastic, gummy material externally thickened at the inner major circumferential portion thereof to define a pair of external shoulders, a triple-laminate reinforcing member secured on the external surface of said envelope and extending adjacent said shoulders, said reinforcing member comprising three laminations, at least one of which comprises a sheet of plastic material which is substantially non-stretchable in a direction parallel to the major circumferential direction of the tube and another of which comprises a rubber-like matrix having a plurality of side-by-side plastic strip elements embedded therein, said strip elements being substantially non-stretchable longitudinally thereof and extending at right angles to said major circumferential direction, and an outer tubular envelope of stretchable elastic material secured on said reinforcing member and said thickened portion of the inner envelope.

References Cited in the file of this patent

UNITED STATES PATENTS

| 1,185,082 | Fitzgerald | May 30, 1916 |
| 1,451,304 | Mitchell | Apr. 10, 1923 |
| 1,455,775 | Berryman | May 22, 1923 |
| 1,628,642 | Bowman | May 17, 1927 |
| 1,683,454 | Fetter | Sept. 4, 1928 |
| 2,055,797 | Loomis | Sept. 29, 1936 |

FOREIGN PATENTS

| 18,636 | Great Britain | 1897 |